(12) United States Patent
McDonald et al.

(10) Patent No.: US 11,776,772 B2
(45) Date of Patent: *Oct. 3, 2023

(54) KEYPAD HAVING ILLUMINATED BUTTONS

(71) Applicant: Lutron Technology Company LLC, Coopersburg, PA (US)

(72) Inventors: Matthew P. McDonald, Phoenixville, PA (US); Sean Tucker, Bethlehem, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 10 days.

This patent is subject to a terminal disclaimer.

(21) Appl. No.: 17/538,287

(22) Filed: Nov. 30, 2021

(65) Prior Publication Data
US 2022/0165515 A1   May 26, 2022

Related U.S. Application Data

(63) Continuation of application No. 17/007,453, filed on Aug. 31, 2020, now Pat. No. 11,217,402, which is a
(Continued)

(51) Int. Cl.
  *H01H 13/02*   (2006.01)
  *H01H 19/14*   (2006.01)
  (Continued)

(52) U.S. Cl.
  CPC .......... *H01H 13/023* (2013.01); *G05B 15/02* (2013.01); *G05G 1/105* (2013.01); *H01H 13/83* (2013.01);
  (Continued)

(58) Field of Classification Search
  CPC ...... H01H 13/023; H01H 13/83; H01H 19/14; H01H 9/181; H01H 2219/038;
  (Continued)

(56) References Cited

U.S. PATENT DOCUMENTS 3,174,023 A   3/1965  Doggart
3,864,561 A   2/1975  Spira et al.
(Continued)

FOREIGN PATENT DOCUMENTS

CN   200944358 Y   9/2007
CN   201327787 Y   10/2009
(Continued)

OTHER PUBLICATIONS

Anonymous, "Le Lab presente l'interrupteur a couronne lumineuse—Espace Grand Public Legrand", Mar. 15, 2017 (Mar. 15, 2017), XP055594454, Retrieved from the Internet: https://www.legrand.fr/actualites/le-lab-by-legrand-prsente-fonctions-lumineuses [retrieved on Apr. 29, 2020] the whole document.
(Continued)

*Primary Examiner* — Renan Luque
(74) *Attorney, Agent, or Firm* — Duane Morris LLP

(57) ABSTRACT

A control device for controlling power delivered to an electrical load may illuminate an area around a button of the control device, such as a gap formed between the button and an opening of a faceplate of the control device. The control device may illuminate the gap to provide a nightlight feature, to provide feedback (e.g., a status of the electrical load), and/or to indicate a selected preset. The button may have a cap portion that may be actuated by a user and a diffuser portion that may contact a rear surface of the cap portion and may conduct light emitted by an internal light source to illuminate the gap around the button.

20 Claims, 14 Drawing Sheets

Related U.S. Application Data continuation of application No. 16/252,195, filed on Jan. 18, 2019, now Pat. No. 10,798,792.

(60) Provisional application No. 62/685,639, filed on Jun. 15, 2018, provisional application No. 62/619,456, filed on Jan. 19, 2018.

(51) Int. Cl.

| | | |
|---|---|---|
| *H01H 13/83* | (2006.01) | |
| *H01H 9/18* | (2006.01) | |
| *G05B 15/02* | (2006.01) | |
| *G05G 1/10* | (2006.01) | |
| *H05B 45/14* | (2020.01) | |
| *H05B 45/10* | (2020.01) | |
| *H05B 47/11* | (2020.01) | |

(52) U.S. Cl.
CPC ............ *H01H 19/14* (2013.01); *H05B 45/14* (2020.01); *H01H 9/181* (2013.01); *H01H 2219/038* (2013.01); *H01H 2219/039* (2013.01); *H01H 2219/056* (2013.01); *H01H 2219/0622* (2013.01); *H05B 45/10* (2020.01); *H05B 47/11* (2020.01)

(58) Field of Classification Search
CPC ....... H01H 2219/039; H01H 2219/056; H01H 2219/0622; G05B 15/02; G05G 1/105; H05B 45/14; H05B 45/10; H05B 47/11; H05B 45/12

See application file for complete search history.

(56) References Cited

U.S. PATENT DOCUMENTS

| | | | |
|---|---|---|---|
| 5,017,837 A | 5/1991 | Hanna et al. | |
| 7,068,948 B2 | 6/2006 | Wei et al. | |
| 7,253,369 B2 * | 8/2007 | Fu .......................... | H01H 13/83 |
| | | | 200/310 |
| 7,692,111 B1 | 4/2010 | Rosing et al. | |
| 7,745,750 B2 | 6/2010 | Hewson et al. | |
| 7,796,057 B2 | 9/2010 | Swatsky et al. | |
| 7,837,344 B2 | 11/2010 | Altonen et al. | |
| 9,141,101 B2 | 9/2015 | Carmen et al. | |
| 10,798,792 B2 * | 10/2020 | McDonald ............ | H01H 19/14 |
| 11,217,402 B2 * | 1/2022 | McDonald ........... | H01H 13/023 |
| 2003/0112160 A1 | 6/2003 | Hsiung et al. | |
| 2004/0134765 A1 | 7/2004 | Sotome | |
| 2004/0163936 A1 | 8/2004 | Clegg et al. | |
| 2005/0230236 A1 * | 10/2005 | Suzuki ................. | H01H 13/023 |
| | | | 200/345 |
| 2005/0269196 A1 | 12/2005 | Brown et al. | |
| 2006/0225995 A1 * | 10/2006 | Ohnishi ................... | H01H 9/18 |
| | | | 200/302.1 |
| 2006/0227528 A1 * | 10/2006 | Nakamoto ........... | H01H 19/025 |
| | | | 362/23.11 |
| 2006/0254895 A1 | 11/2006 | Tsubota et al. | |
| 2007/0217211 A1 | 9/2007 | Hewson et al. | |
| 2008/0237010 A1 | 10/2008 | Patel et al. | |
| 2010/0084253 A1 * | 4/2010 | Bollmann ............ | H01H 25/041 |
| | | | 200/5 R |
| 2010/0148996 A1 | 6/2010 | Wang | |
| 2010/0302166 A1 | 12/2010 | Zhang et al. | |
| 2011/0056380 A1 * | 3/2011 | Kim ....................... | G05G 1/105 |
| | | | 96/423 |
| 2011/0122082 A1 | 5/2011 | Orellana | |
| 2011/0181446 A1 | 7/2011 | O'Donnell | |
| 2011/0194303 A1 | 8/2011 | Akabori et al. | |
| 2013/0016053 A1 | 1/2013 | Jung | |
| 2013/0162450 A1 | 6/2013 | Leong et al. | |
| 2014/0027259 A1 | 1/2014 | Kawana et al. | |
| 2014/0125463 A1 | 5/2014 | Carmen, Jr. et al. | |
| 2015/0279580 A1 * | 10/2015 | Okazaki ................. | H01H 3/12 |
| | | | 200/4 |
| 2016/0069537 A1 | 3/2016 | Dimberg et al. | |
| 2016/0073467 A1 | 3/2016 | McDonald et al. | |
| 2016/0307714 A1 | 10/2016 | Bhate et al. | |
| 2016/0353543 A1 | 12/2016 | Twaddell et al. | |
| 2017/0025234 A1 * | 1/2017 | Huang ................... | H01H 13/83 |
| 2017/0053375 A1 | 2/2017 | Adams et al. | |
| 2017/0102493 A1 | 4/2017 | Shivell et al. | |
| 2017/0148588 A1 * | 5/2017 | Mau ..................... | H01H 13/14 |
| 2017/0330704 A1 * | 11/2017 | Chen .................... | H03K 17/967 |
| 2018/0115304 A1 * | 4/2018 | Takada ................. | H01H 19/025 |
| 2018/0174777 A1 | 6/2018 | Clementson | |
| 2018/0233303 A1 | 8/2018 | Wu et al. | |

FOREIGN PATENT DOCUMENTS

| | | |
|---|---|---|
| CN | 102842449 A | 12/2012 |
| CN | 104238384 A | 12/2014 |
| CN | 206742111 U | 12/2017 |
| EP | 1511050 A2 | 3/2005 |
| JP | 2001352379 A | 12/2001 |
| WO | 2016141062 A2 | 9/2016 |
| WO | 2017130816 A1 | 8/2017 |

OTHER PUBLICATIONS

First Office Action dated Nov. 29, 2021 issued in corresponding Chinese Patent Application No. 201980009083.1, 15 pages.

International Search Report and Written Opinion dated Jun. 19, 2019 for corresponding PCT Application No. PCT/US2019/014297, 13 pages.

\* cited by examiner

KEYPAD HAVING ILLUMINATED BUTTONS

CROSS-REFERENCE TO RELATED APPLICATIONS

This application is a continuation of U.S. patent application Ser. No. 17/007,453, filed Aug. 31, 2020, which is a continuation of U.S. patent application Ser. No. 16/252,195, filed Jan. 18, 2019, now U.S. Pat. No. 10,798,792, which claims the benefit of U.S. Provisional Patent Application No. 62/619,456, filed Jan. 19, 2018, and U.S. Provisional Patent Application No. 62/685,639, filed Jun. 15, 2018, the entire disclosures of which are hereby incorporated by reference.

BACKGROUND

Home automation systems, which have become increasing popular, may be used by homeowners to integrate and control multiple electrical and/or electronic devices in their house. For example, a homeowner may connect appliances, lights, blinds, thermostats, cable or satellite boxes, security systems, telecommunication systems, and the like to each other via a wireless network. The homeowner may control these devices using a controller, a remote control device (such as a wall-mounted keypad), or user interface provided via a phone, a tablet, a computer, and the like directly connected to the network or remotely connected via the Internet. These devices may communicate with each other and the controller to, for example, improve their efficiency, their convenience, and/or their usability. The control devices may be configured to provide feedback, for example, by illuminating one or more visual indicators, to indicate a state and/or present level of the system, the control device, and/or one or more of the electrical loads.

SUMMARY

As described herein, a control device for controlling power delivered to an electrical load may illuminate an area around a button of the control device. For example, the control device may illuminate a gap formed between the button and an opening of a faceplate of the control device when the button is received in the opening of the faceplate. The control device may include a light source that may be located inside of the control device and may illuminate the gap between the button and the opening of the faceplate. The control device may also include a control circuit that may be configured to cause the power delivered to the electrical load to be adjusted in response to an actuation of the button.

The control circuit may be configured to control the light source to illuminate the gap between the button and the opening of the faceplate. For example, the control circuit may illuminate the gap to a dim level to provide a nightlight feature. The control circuit may illuminate the gap in response to an actuation of the button. The control circuit may illuminate the gap to provide an indication of a status of the electrical load. The control device may comprise comprises a plurality of buttons received in respective openings of the faceplate, and the control circuit may illuminate a gap around one of the buttons to indicate a selected preset.

The control device may include a control module for housing the light source and a mechanical switch configured to be actuated by the button. The faceplate may be attached to the control module. The button of the control device may have a cap portion that may be actuated by the user and a diffuser portion that may contact a rear surface of the cap portion and may conduct light emitted by the light source to illuminate the gap around the button. The opening in the faceplate may have a beveled edge that extends from an outer periphery at a front surface of the faceplate to an inner periphery that is characterized by a smaller diameter than the outer periphery. The gap may be formed between the button and the inner periphery of the opening. The rear surface of the cap portion is positioned to the front of a plane of the inner periphery when the button is received in the opening of the faceplate. In addition, the diffuser portion may extend beyond a plane of the front surface of the faceplate.

DETAILED DESCRIPTION

Figure 1:
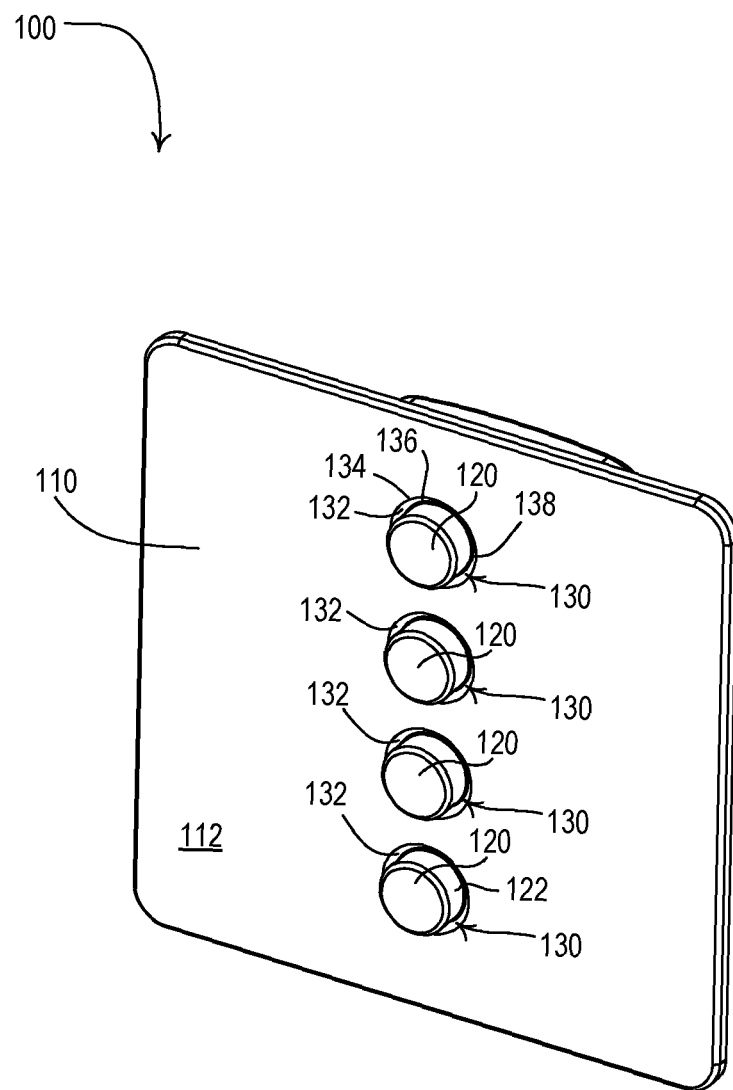
FIG. 1 is a perspective view of an example control device (e.g., a wall-mounted keypad) for use in a load control system for controlling the amount of power delivered to one or more electrical loads.
Figure 2:
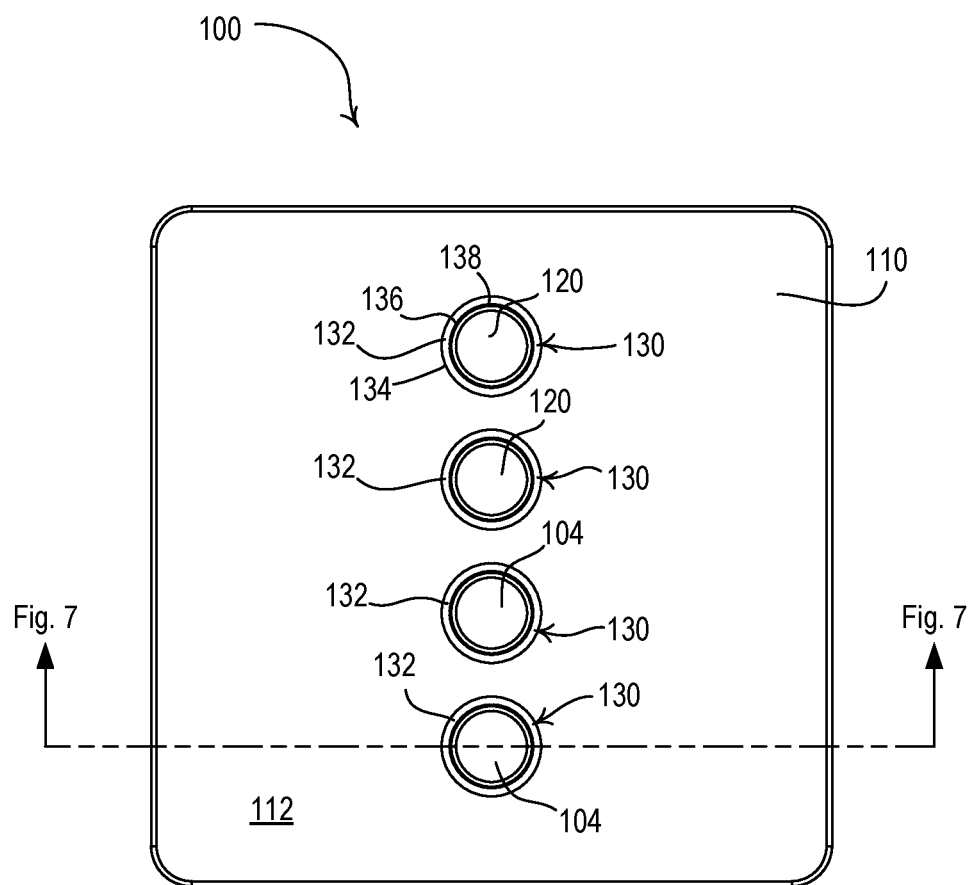
FIG. 2 is an example front view of the control device of FIG. 1.

FIG. 1 is a perspective view and FIG. 2 is a front view of an example control device (e.g., a wall-mounted keypad 100) for controlling the amount of power delivered to one or more electrical loads (e.g., lighting loads), for example, as part of a load control system. The keypad 100 may comprise a faceplate 110 and one or more buttons 120 (e.g., four circular buttons as shown in FIG. 1) received through respective openings 130 of the faceplate 110. The faceplate 110 and the buttons 120 may have metallic surfaces. The openings 130 in the faceplate 110 may each have respective beveled surfaces 132 that slope from an outer periphery 134 (e.g., an outer circular periphery) at a front surface 112 of the faceplate to an inner periphery 136 (e.g., an inner circular periphery). The inner periphery 136 of each opening 130 may be characterized by a smaller diameter than the outer periphery 134. The inner periphery 136 of each opening 130 may be spaced apart from the respective button 120 to form gaps 138 around the buttons.

In response to an actuation of one or more of the buttons 120, the keypad 100 may be configured to cause the electrical loads to be controlled, for example, to turn the electrical loads on and off and/or the adjust the amount of power delivered to the electrical loads (e.g., dimming control). For example, the keypad 100 may transmit a digital message to one or more external load control devices (e.g., dimmers, light-emitting diode drivers, motorized window treatments, thermostats, system controllers, etc.) via a communication link for controlling respective electrical loads in response to an actuation of one of the buttons 120. The communication link may comprise a wired communication link or a wireless communication link, such as a radio-frequency (RF) communication link. Alternatively or additionally, the keypad 100 may comprise an internal load control circuit for controlling the power delivered to one or more electrical loads (e.g., electrically coupled to the keypad), and may be configured to control the internal load control circuit in response to an actuation of one of the buttons. Examples of load control systems having remote control devices, such as the keypad 100, are described in greater detail in commonly-assigned U.S. Pat. No. 6,803,728, issued Oct. 12, 2004, entitled SYSTEM FOR CONTROL OF DEVICES, and U.S. Pat. No. 9,553,451, issued Jan. 24, 2017, entitled LOAD CONTROL SYSTEM HAVING INDEPENDENTLY-CONTROLLED UNITS RESPONSIVE TO A BROADCAST CONTROLLER, the entire disclosures of which are hereby incorporated by reference.

Actuations of the buttons 120 may cause the keypad 100 to control the electrical load according to respective commands (e.g., predetermined and/or preprogrammed commands). For example, the buttons 120 of the keypad 100 may comprise an on button for turning on the electrical load, an off button for turning off the electrical load, a raise button for increasing the amount of power delivered to the electrical load, and/or a lower button for decreasing the amount of power delivered to the electrical load. Additionally or alternatively, actuations of the one or more of the buttons 120 may recall respective presets (e.g., predetermined and/or preprogrammed presets or scenes), which may cause one or more electrical loads to be controlled to different power levels as set by the presets. The buttons 120 may each comprise indicia (not shown), such as text or icons, for indicating the command and/or preset that may be selected in response to an actuation of the respective button. Additionally or alternatively, the faceplate 110 may have indicia on the front surface 112 of the faceplate adjacent to each of the buttons 120 for indicating the command and/or preset that may be selected in response to an actuation of the respective button.

The keypad 100 may be configured to illuminate an area around each of the buttons 120, for example, by illuminating the gap 138 around each of the buttons 120. For example, the keypad 100 may be configured to illuminate the gaps 138 to provide feedback to a user. The keypad 100 may be configured to illuminate the gap 138 around one of the buttons 120 (e.g., by blinking and/or strobing the illumination) when that button is actuated (e.g., to indicate that the command has been received and/or the keypad 100 is transmitting a message to external load control devices). The keypad 100 may be configured to illuminate the gap 138 around one of the buttons 120 to indicate the status of one or more associated electrical loads (e.g., status information regarding whether the electrical loads are on or off). The keypad 100 may be configured to illuminate the gap 138 around one of the buttons 120 to indicate the selection of a respective preset associated with the button. For example, the keypad 100 may be configured to illuminate the gap 138 around the button 120 of the selected preset to a first intensity level and to illuminate the gaps 138 around each of the other buttons to a second intensity level that may be less than the first intensity level. The keypad 100 may be configured to illuminate the gaps 138 around one or more of the buttons 120 (e.g., solidly illuminate, blink, or strobe) for an amount of time after an actuation of the button and then turn off the illumination. In addition, the keypad 100 may be configured to illuminate the gaps 138 (e.g., to a dim level) to provide a nightlight feature, so that the keypad may be located in a dark environment.

Figure 3:
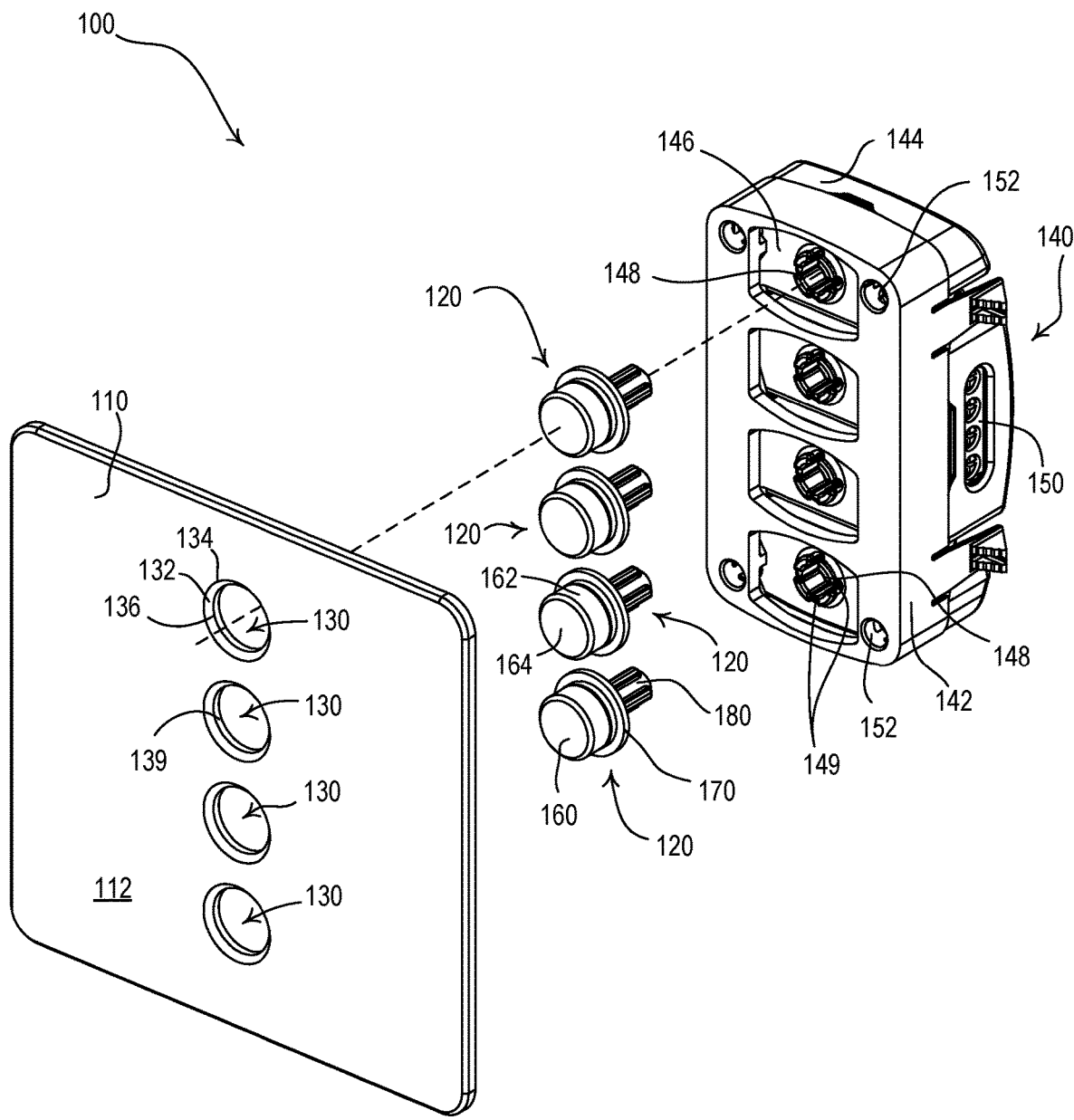
FIG. 3 is an example front exploded view of the control device of FIG. 1.
Figure 4:
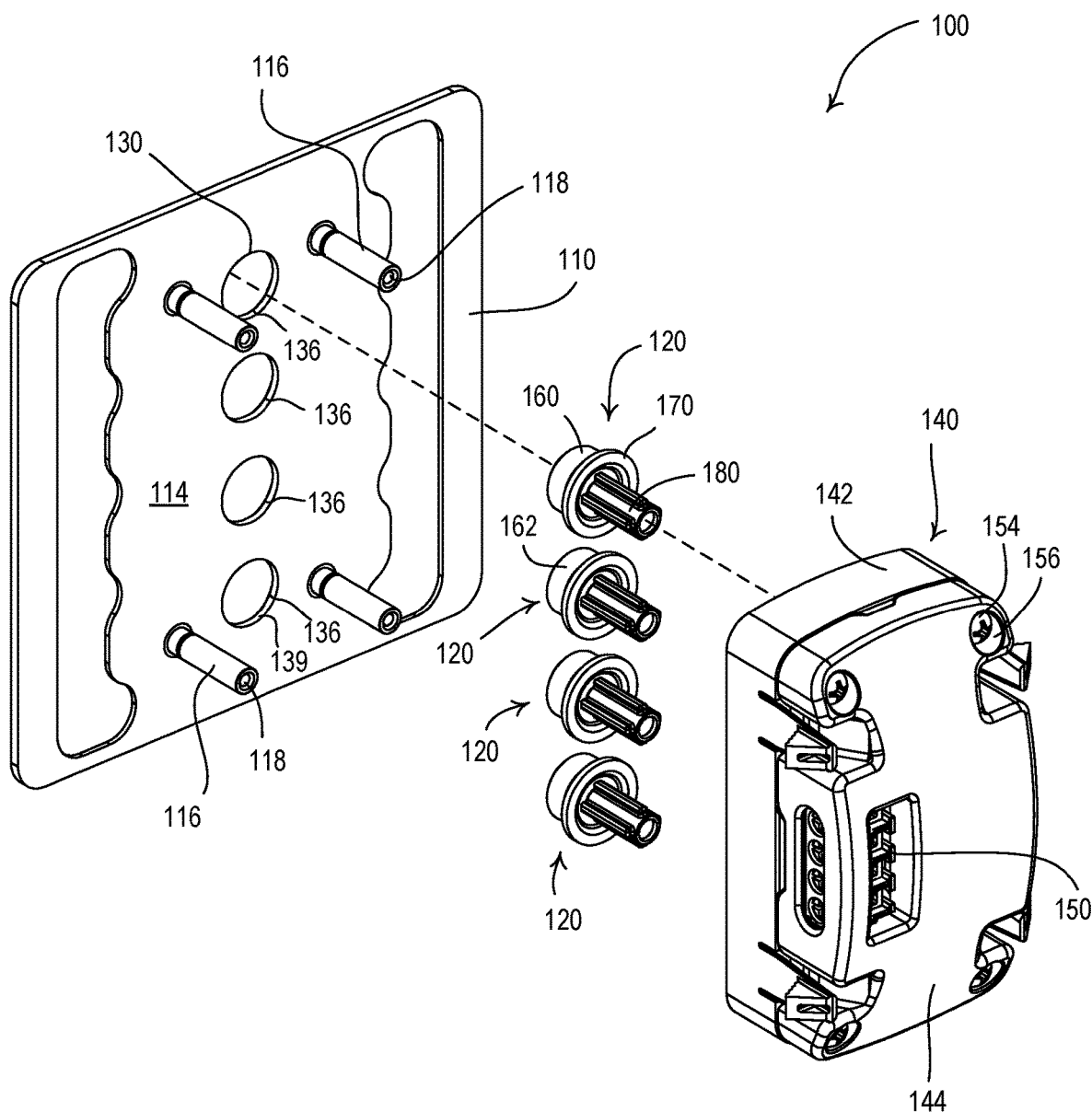
FIG. 4 is an example rear exploded view of the control device of FIG. 1.

FIG. 3 is an example front exploded view and FIG. 4 is an example rear exploded view of the keypad 100. The keypad 100 may comprise a control module 140, which may include the electrical circuitry of the keypad (e.g., as will be described with reference to FIG. 17). The control module 140 may comprise an enclosure having a front enclosure portion 142, a rear enclosure portion 144, and a carrier 146 (e.g., a button support structure). The control module 140 may comprise a connector 150 that may allow the control module to be electrically connected to a power source and/or a wired communication link (e.g., digital communication link and/or an analog control link).

The buttons 120 may each comprise a cap portion 160, a diffuser portion 170, and an elongated portion 180. The cap portion 160 of each button 120 may be opaque. For example, each cap portion 160 may be made of metal. Alternatively, each cap portion 160 may be covered with an opaque material, such as a metallic sheet and/or paint. The cap portion 160 of each button 120 may comprise a sidewall 162 and be received in the respective opening 130 in the faceplate 110. Each cap portion 160 may have a front surface 164 that may be actuated (e.g., pressed in towards the control module 140) by a user when the cap portion 160 is received in the respective opening 130. As shown in FIGS. 3 and 4, the inner periphery 136 of each opening 130 may be located in a plane parallel to a plane of the front surface 112 of the faceplate and located between the front surface 112 and a rear surface 114 of the faceplate. The openings 130 may also comprise sidewalls 139 that that extend between the inner periphery 136 and the rear surface 114 of the faceplate 110. The sidewalls 139 of the openings 130 may be substantially parallel to the sidewalls 162 of the cap portions 160 of the respective buttons 120 when the cap portions 160 are received in the openings 130.

The diffuser portion 170 may have a larger periphery than the inner periphery 136 of the respective opening 130 (e.g., when the button 120 is received in the opening). The diffuser portion 170 may be positioned behind and overlap the gap 138 of the respective opening 130 when the cap portion 160 is received in the opening 130. The diffuser portion 170 may conduct light emitted from light source(s) inside the control module 140 (e.g., light-emitting diodes 194 shown in FIG. 7) to illuminate the gap 138 around the respective button 120.

The elongated portion 180 of each button 120 may be received in respective openings 148 of the carrier 146 of the control module 140 and may actuate a respective mechanical switch, for example, inside of the control module 140. The cap portion 160 of each button 120 may be received in the respective openings 130 of the faceplate 110. The faceplate 110 may comprise posts 116 that extend from the rear surface 114 of the faceplate 110, and may be received in openings 152 in the front enclosure portion 142 of the control module 140. The faceplate 110 may be attached to the control module 140 via attachment screws 154 received through openings 156 in the rear enclosure portion 144 and openings 118 (e.g., threaded openings) in the posts 116 of the faceplate when the posts are located in the openings 152 of the front enclosure portion 142. When the faceplate 110 is attached to the control module 140, the buttons 120 may be captured between the faceplate and the control module.

Figure 5:
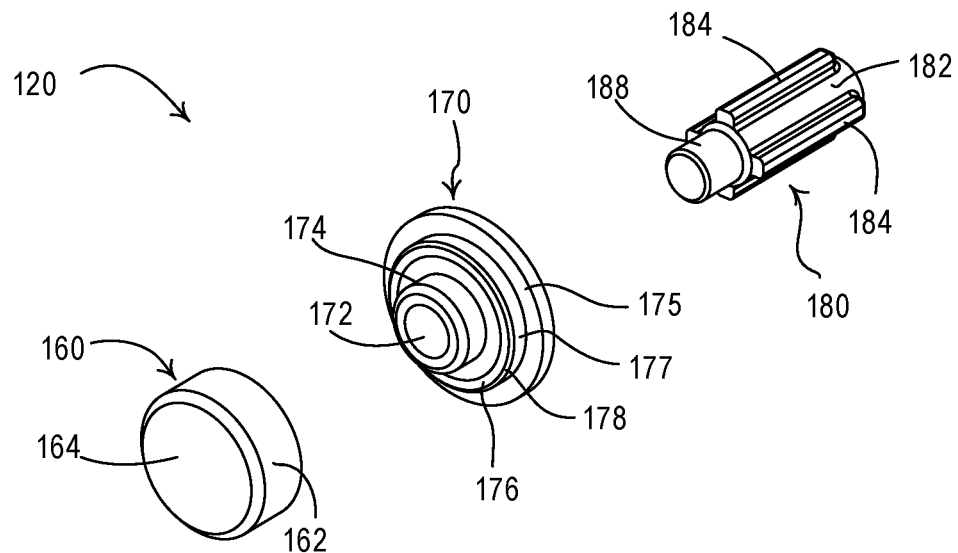
FIG. 5 is an example front exploded view of a button of the control device of FIG. 1.
Figure 6:
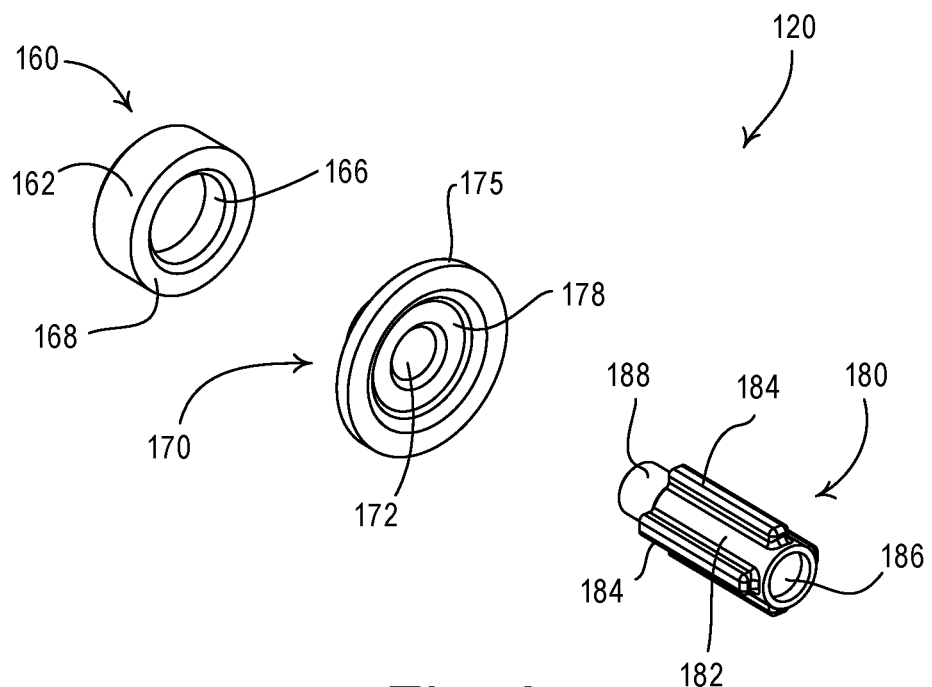
FIG. 6 is an example rear exploded view of the button of FIG. 5.

FIG. 5 is an example front exploded view and FIG. 6 is an example rear exploded view of one of the buttons 120 of the keypad 110. The elongated portion 180 may comprise a base 182 (e.g., a cylindrical base) having ribs 184. The ribs 184 may be received in corresponding grooves 149 of the openings 148 of the carrier 146 to prevent rotation of the buttons 120 when the elongated portions are inserted in the openings 148. The elongated portion 180 may comprise a recess 186 for interacting with the respective internal mechanical switch (e.g., as will be described in greater detail below with reference to FIG. 7). The elongated portion 180 may also comprise an end portion 188 (e.g., a cylindrical end portion) configured to be received in an opening 172 (e.g., a cylindrical opening) of the diffuser portion 170. The diffuser portion 170 may comprise a projection 174 (e.g., a cylindrical drum) configured to be received in a recess 166 in a rear surface 168 of the cap portion 160. The diffuser portion 170 may also comprise a flange 175 that may surround the projection 174. The flange 175 may contact the rear surface 114 of the faceplate 110 when the faceplate is connected to the control module 140, e.g., to capture the button 120 between the faceplate and the control module.

Figure 7:
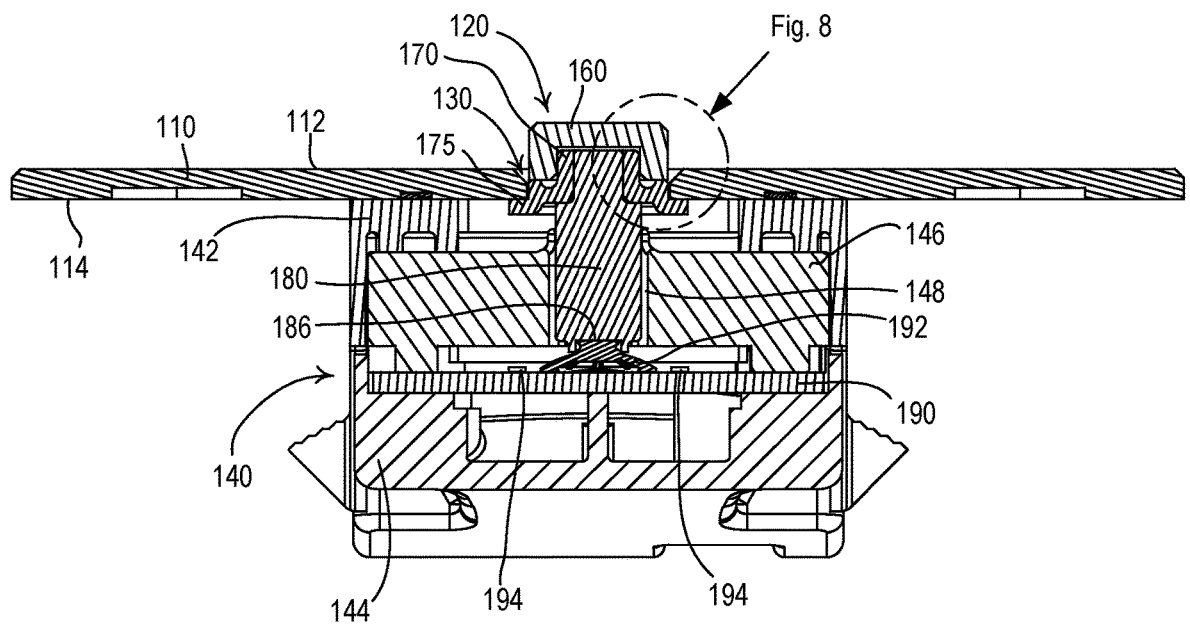
FIG. 7 is an example bottom cross-sectional view of the control device of FIG. 1 taken through the center of a button of the control device.

FIG. 7 is a bottom cross-sectional view of the keypad 100 taken through the center of one of the buttons 120, for example, the bottom button as shown in FIG. 2. The control module 140 may comprise a printed circuit board (PCB) 190 mounted between the front enclosure portion 142 and the rear enclosure portion 144. The control module 140 may include one or more mechanical switches that each comprise a deflectable dome 192 (e.g., a conductive dome) that may be received in the recess 186 of the elongated portion 180 of the respective button 120. When the button 120 is pushed in towards the control module 140, the dome 192 may be configured to flex and contact the printed circuit board 190, which may short out electrical traces on the printed circuit board 190 and indicate the actuation of the button to a control circuit (not shown) of the keypad 100. Examples of keypads having mechanical switches that include deflectable domes are described in greater detail in commonly-assigned U.S. Pat. No. 10,181,385, issued Jan. 15, 2019, entitled CONTROL DEVICES HAVING INDEPENDENTLY SUSPENDED BUTTONS FOR CONTROLLED ACTUATION, the entire disclosure of which is hereby incorporated by reference. Additionally or alternatively, the mechanical switches of the control module 140 may comprise mechanical tactile switch packages mounted to the printed circuit board 190 and/or another type of switching mechanism and/or circuit.

Figure 8:
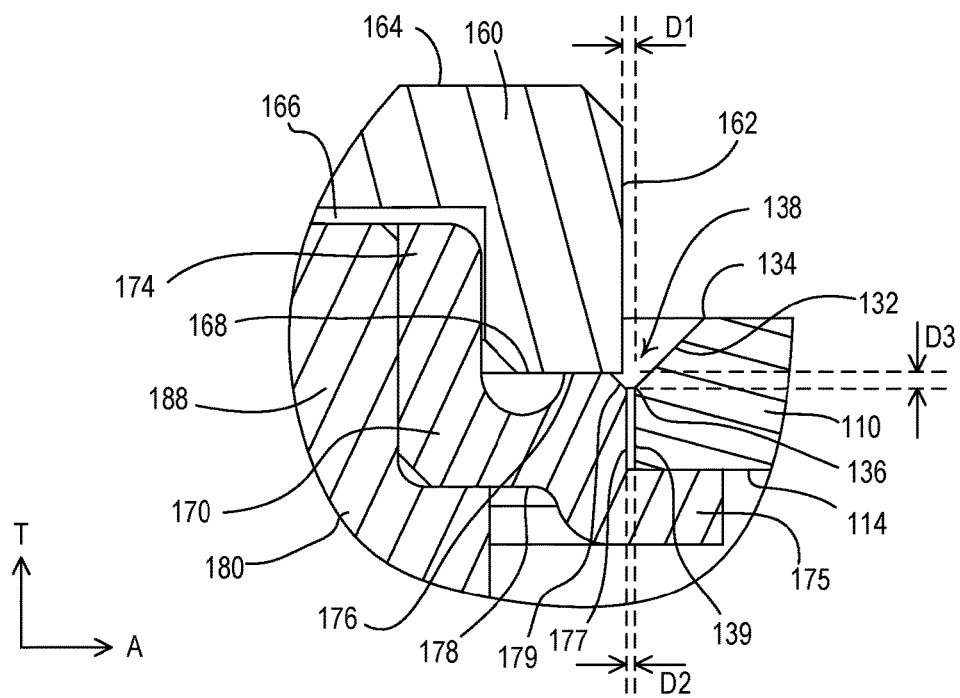
FIG. 8 is an example enlarged portion of the bottom cross-sectional view of FIG. 7.

The control module 140 may further comprise one or more light sources, such as light-emitting diodes (LEDs) 194, mounted to the printed circuit board 190. For example, the control module 140 may comprise two LEDs 194 mounted behind each of the buttons 120, for example, on both sides of each of the dome 192 as shown in FIG. 8. The carrier 146 of the control module 140 may be made of a transparent or translucent material to allow light emitted by the LEDs 194 to be conducted through the carrier towards the faceplate 110. The diffuser portion 170 of each of the buttons 120 may operate to conduct the light emitted by the LEDs 194 to the gaps 138 surrounding each of the buttons 120.

FIG. 8 is an enlarged partial bottom cross-sectional view showing the structure of the keypad 100 around the gaps 138 between one of the buttons 120 and the faceplate 110 in greater detail. The sidewall 162 of the cap portion 160 of each button 120 may be spaced apart from the sidewall 139 of the respective opening 130 by a distance D1 (e.g., approximately 0.0075") in a lateral direction A of the keypad 100 as shown in FIG. 8. The rear surface 168 of the cap portion 160 of each button 120 may contact a support surface 176 of the diffuser portion 170. The diffuser portion 170 may have a sidewall 177 and a rear surface 178 that may be opposite the support surface 176. The diffuser portion 170 may be characterized by a radius at the sidewall 177 that is slightly bigger than a radius of the cap portion 162. The sidewall 177 of the diffuser portion 170 may be spaced apart from the sidewall 139 of the respective opening 130 by a distance D2 (e.g., approximately 0.005") in the lateral direction A. For example, the radius of the diffuser portion 170 at the sidewall 177 may be approximately 0.0025" larger than the radius of the cap portion 162.

The rear surface 168 of the cap portion 160 may be spaced to the front of the plane of the inner periphery 136 of the opening 130 by a distance D3 (e.g., approximately 0.009") in a transverse direction T of the keypad 100, which may allow more exposure of the diffuser portion 170 to the view of a user of the keypad. The diffuser portion 170 may comprise a light-emitting surface 179 between the support surface 176 and the sidewall 177. The diffuser portion 170 may conduct light emitted by the LEDs 194 received by the rear surface 178 of the diffuser portion to the light-emitting surface 179. The light-emitting surface 179 may be configured to emit light through the gap 138 around the respective button 120. The light-emitting surface 179 may be oriented at an angle with respect to the support surface 176 and the sidewall 177.

While the diffuser portion 170 is shown connected to the cap portion 160 and the elongated portion 180 of the button in FIGS. 3-8, the diffuser portion 170 may alternatively be coupled to the sidewall 139 of the opening and/or the rear surface 114 of the faceplate 100. The cap portion 160 may be connected to the elongated portion 180 (e.g., directly connected to only the elongated portion) and may move through an opening in the diffuser portion to actuate the mechanical switch in response to an actuation of the cap portion 160.

Figure 9:
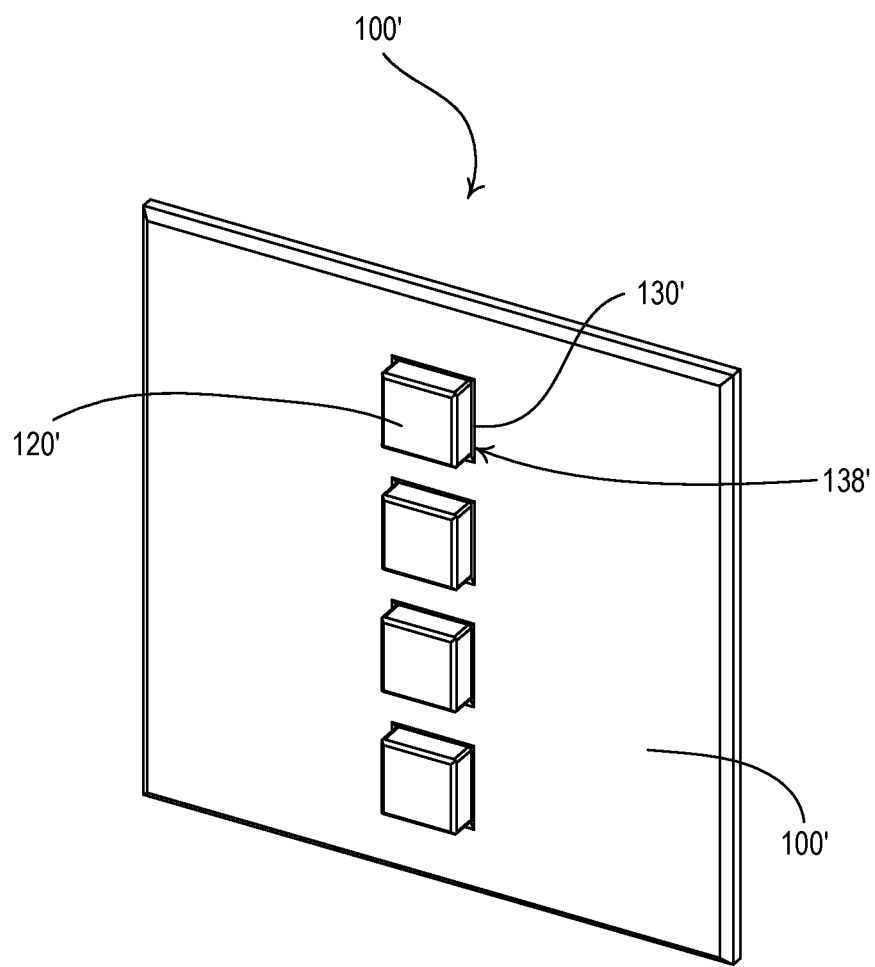
FIG. 9 is a perspective view of another example control device.

While the keypad 100 shown in FIGS. 1-8 and described herein has circular buttons 120 and circular openings 130 in the faceplate 110, the buttons and the openings may have different shapes, sizes, and depths. In addition, the faceplate 110 may have a different shape, size, and/or thickness. FIG. 9 is a perspective view of another example keypad 100' having square buttons 120' received in square openings 130' of a square faceplate 110' to form a square gap 138'. The buttons 120, 120', the openings 130, 130', the faceplates 110, 110', and the gaps 138, 138' may also have other shapes, such as rectangle, triangle, oval, and/or ellipse shapes.

Figure 10:
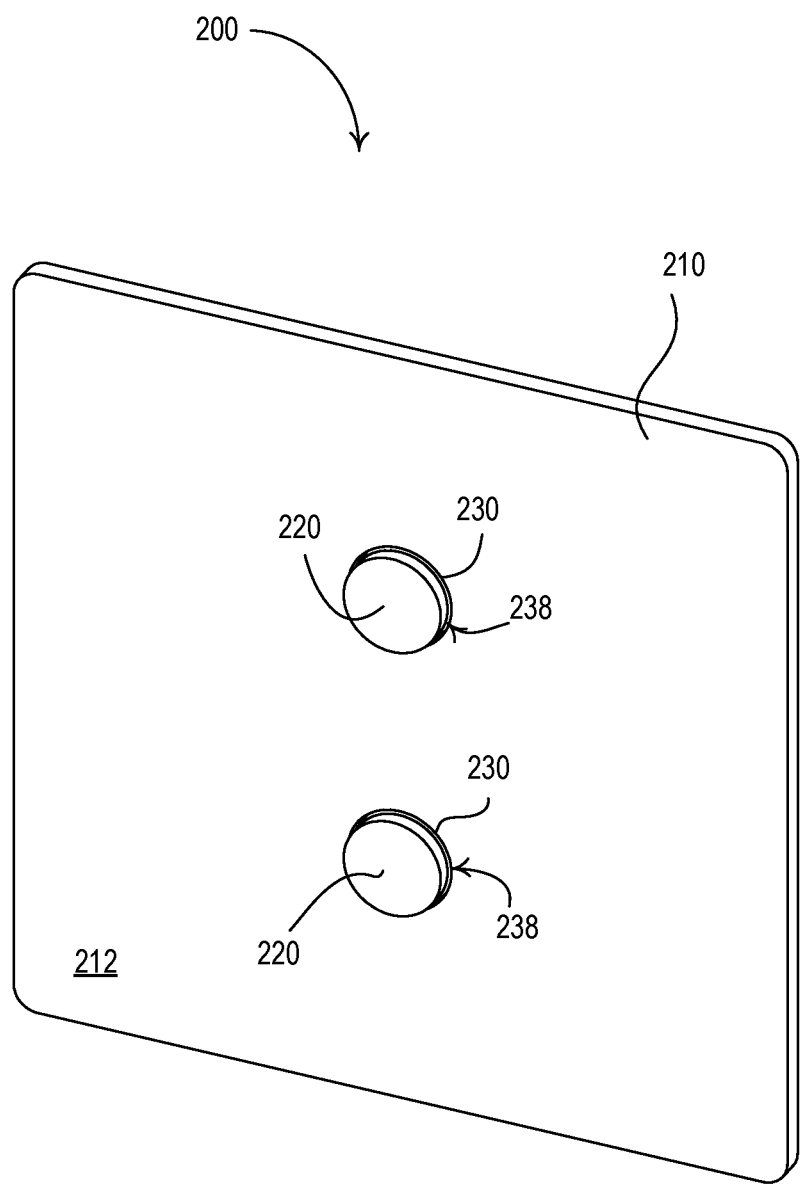
FIG. 10 is a perspective view of another example control device (e.g., a wall-mounted keypad) for use in a load control system for controlling the amount of power delivered to one or more electrical loads.
Figure 11:
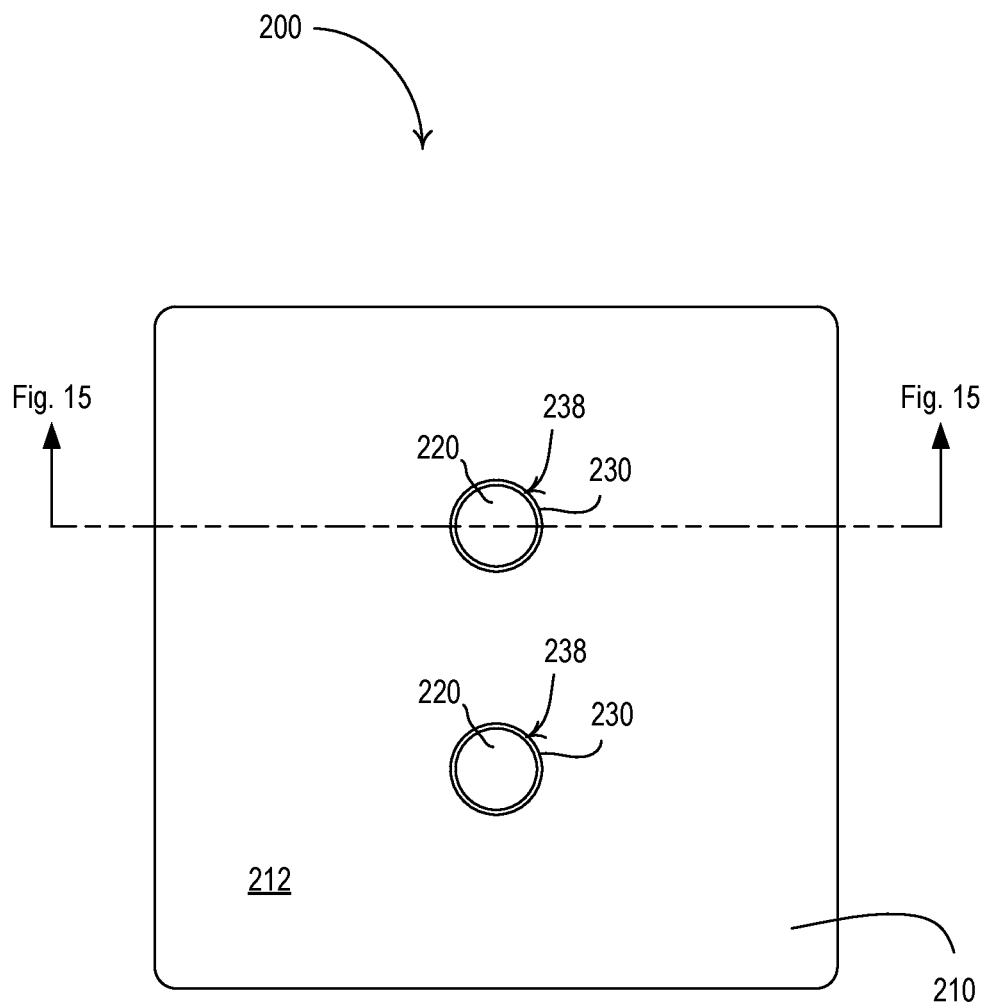
FIG. 11 is an example front view of the control device of FIG. 10.
Figure 12:
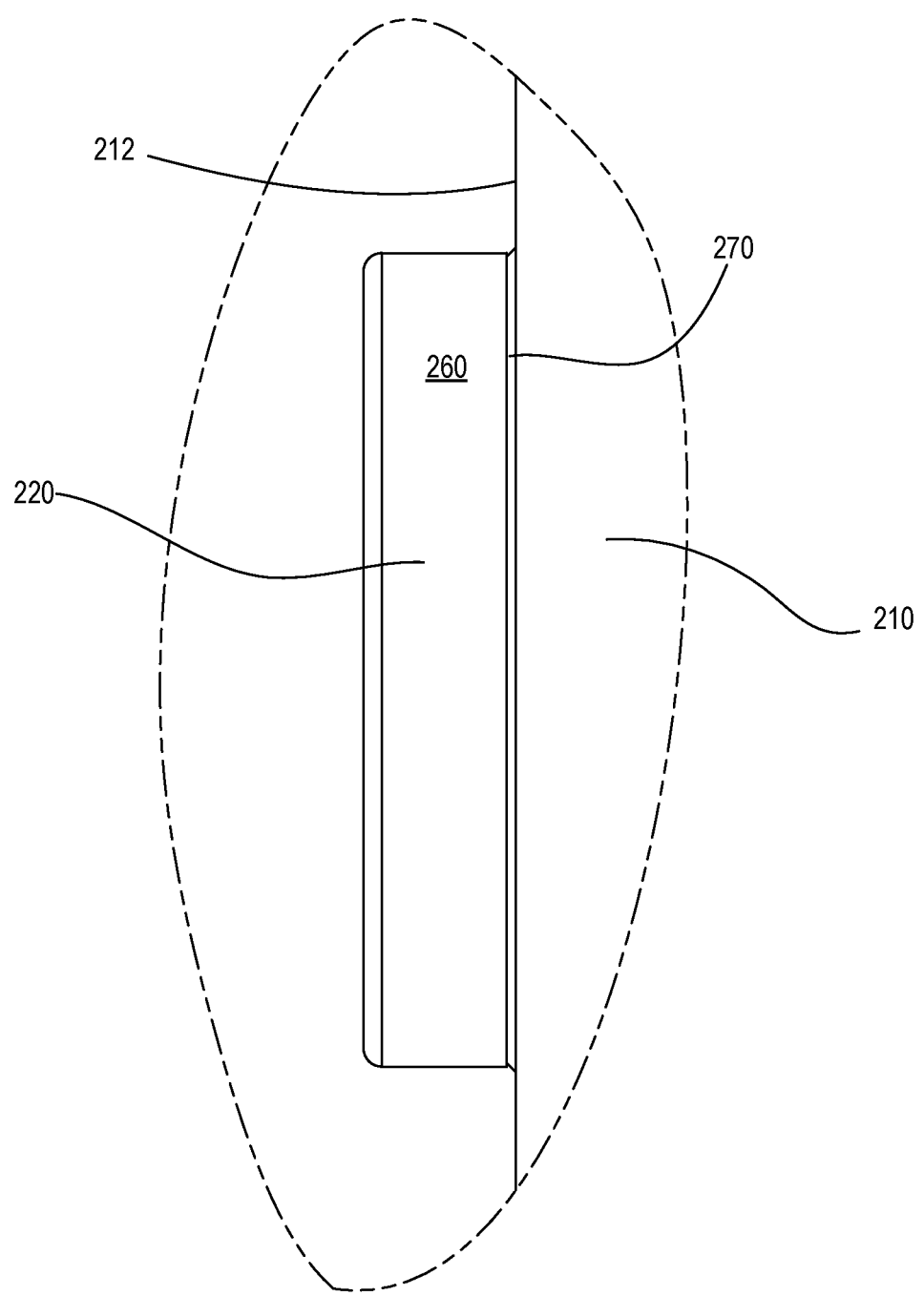
FIG. 12 is an enlarged side view of a button of the control device of FIG. 10.

FIGS. 10-16 illustrate another example control device (e.g., a wall-mounted keypad 200) for controlling the amount of power delivered to one or more electrical loads (e.g., lighting loads). The keypad 200 may have many of the same elements and features as the keypad 100 shown in FIGS. 1-8. FIG. 10 is a perspective view and FIG. 11 is a front view of the keypad 200. The keypad 200 may comprise a faceplate 210 and one or more buttons 220 (e.g., two circular buttons as shown in FIG. 10) received through respective openings 230 in a front surface 212 of the faceplate 210. FIG. 12 is an enlarged side view of one of the buttons 220 of the keypad 200. The faceplate 210 and the buttons 220 may have metallic surfaces. The openings 230 of the faceplate 210 may not have beveled edges (e.g., as the openings 130 shown in FIGS. 1-8). Each opening 230 may be spaced apart from the respective button 220 to form gaps 238 around the buttons.

The keypad 200 may be configured to cause the electrical loads to be controlled (e.g., to turn the electrical loads on and off and/or the adjust the amount of power delivered to the electrical loads) in response to an actuation of one or more of the buttons 220. For example, the keypad 200 may transmit a digital message to one or more external load control devices via a communication link (e.g., a wired or wireless communication link) for controlling respective electrical loads in response to an actuation of one of the buttons 220. Alternatively or additionally, the keypad 200 may comprise an internal load control circuit for controlling the power delivered to one or more electrical loads (e.g., electrically coupled to the keypad), and may be configured to control the internal load control circuit in response to an actuation of one of the buttons 220. Actuations of the buttons 220 may cause the keypad 200 to control the electrical load according to respective commands (e.g., predetermined and/or preprogrammed commands). For example, actuations of the buttons 220 of the keypad 200 may cause the one or more electrical loads to be controlled according to predetermined and/or preprogrammed commands (e.g., to turn on or off, and/or to adjust the amount of power delivered to the electrical load) and/or according to predetermined and/or preprogrammed presets (e.g., predetermined and/or preprogrammed scenes).

The keypad 200 may be configured to illuminate an area around each of the buttons 220, for example, by illuminating the gap 238 around each of the buttons 220. For example, the keypad 200 may be configured to illuminate the gaps 238 to provide feedback to a user. The keypad 200 may be configured to illuminate the gap 238 around one of the buttons 220 (e.g., by blinking and/or strobing the illumination) when that button is actuated (e.g., to indicate that the command has been received and/or the keypad 200 is transmitting a message to external load control devices). The keypad 200 may be configured to illuminate the gap 238 around one of the buttons 220 to indicate the status of one or more associated electrical loads and/or to indicate the selection of a respective preset associated with the button. For example, the keypad 200 may be configured to illuminate the gap 238 around the button 220 of the selected preset to a first intensity level and to illuminate the gaps 238 around each of the other buttons to a second intensity level that may be less than the first intensity level. The keypad 200 may be configured to illuminate the gaps 238 around one or more of the buttons 220 (e.g., solidly illuminate, blink, or strobe) for an amount of time after an actuation of the button and then turn off the illumination. In addition, the keypad 200 may be configured to illuminate the gaps 238 (e.g., to a dim level) to provide a nightlight feature, so that the keypad may be located in a dark environment.

Figure 13:
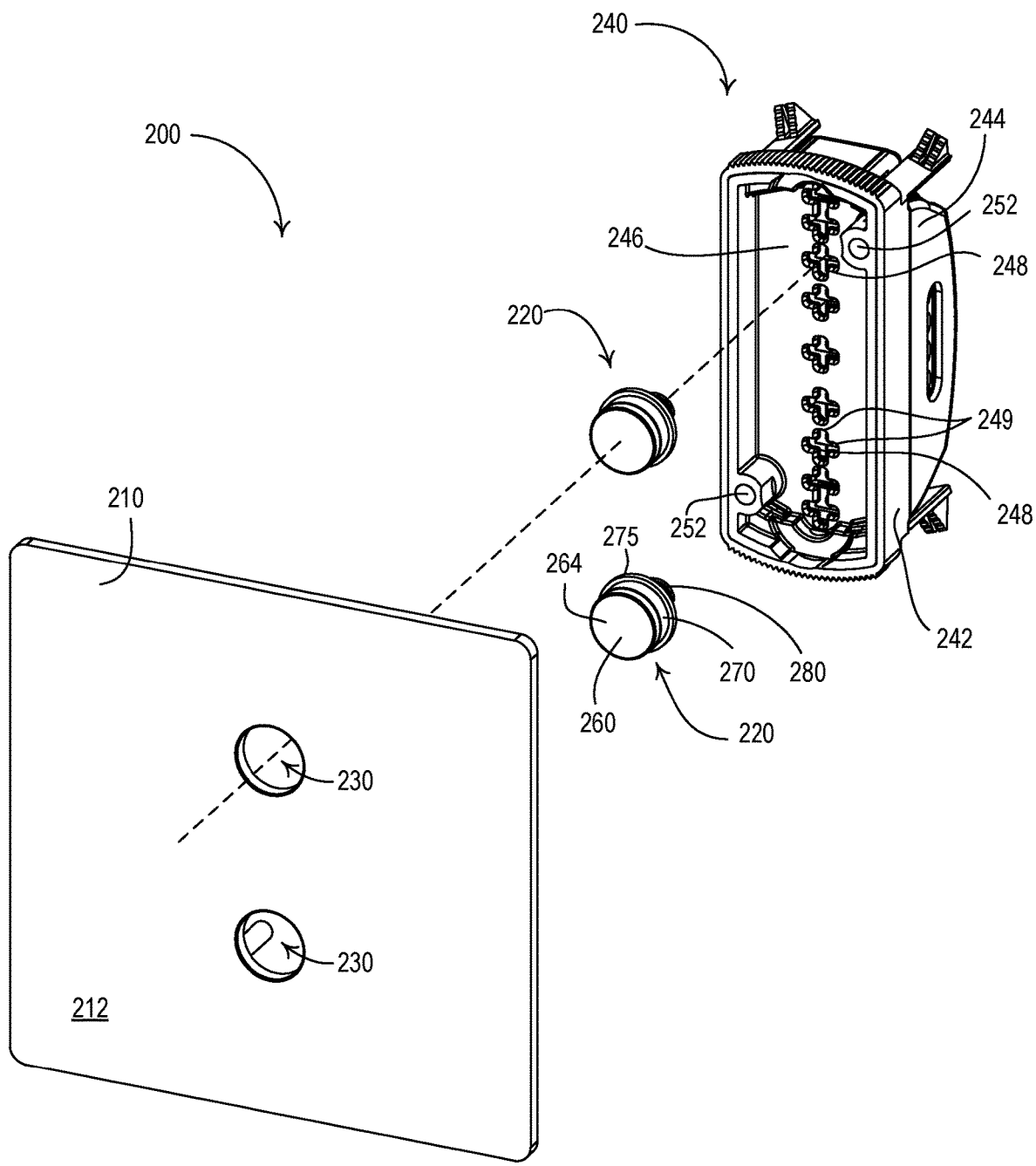
FIG. 13 is an example front exploded view of the control device of FIG. 10.
Figure 14:
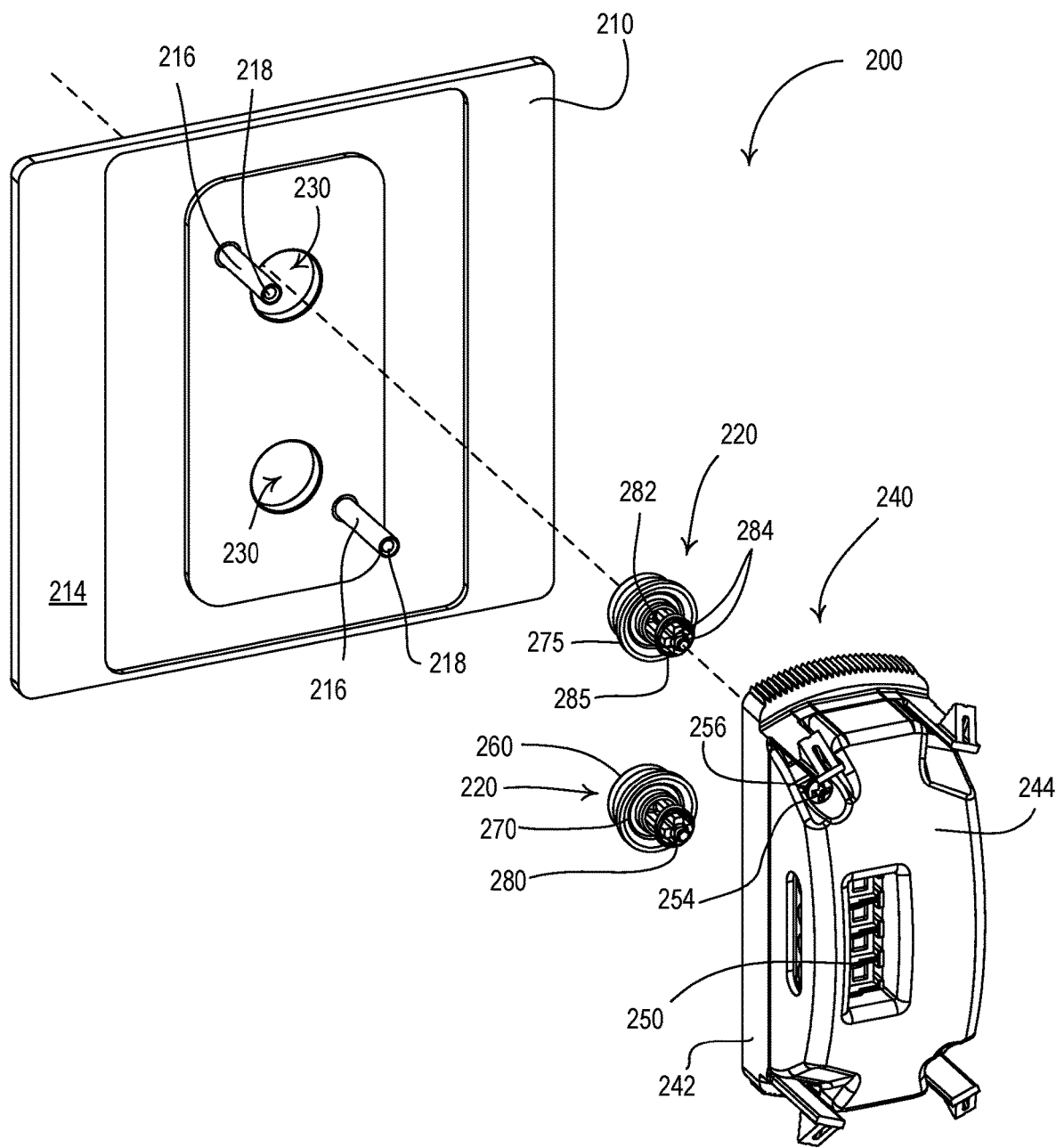
FIG. 14 is an example rear exploded view of the control device of FIG. 10.

FIG. 13 is an example front exploded view and FIG. 14 is an example rear exploded view of the keypad 200. The keypad 200 may comprise a control module 240, which may include the electrical circuitry of the keypad (e.g., as will be described with reference to FIG. 17) and may be connected (e.g., directly connected) to a rear surface 214 of the faceplate 210. The control module 240 may comprise an enclosure having a front enclosure portion 242, a rear enclosure portion 244, and a carrier 246 (e.g., a button support structure). The control module 240 may comprise a connector 250 that may allow the control module to be electrically connected to a power source and/or a wired communication link (e.g., digital communication link and/or an analog control link).

The buttons 220 may each comprise a cap portion 260, a diffuser portion 270, and an elongated portion 280. The cap portion 260 of each button 220 may be received in the respective openings 230 of the faceplate 210. The cap portion 260 of each button 220 may be opaque (e.g., made of metal) and/or may be covered with an opaque material (e.g., such as a metallic sheet and/or paint). Each cap portion 260 may have a front surface 264 that may be actuated (e.g., pressed in towards the control module 240) by a user when the cap portion 260 is received in the respective opening 230. When the buttons 220 are received in the openings 230 of the faceplate 210, the diffuser portion 270 may extend beyond a plane of a front surface of the faceplate 210, such that the diffuser portion 270 can be seen from the sides of the keypad 200 (e.g., as shown in FIG. 12). The diffuser portion 270 may also comprise a flange 275, such that the diffuser portion 270 may have a larger periphery than the respective opening 230 of the faceplate 210 (e.g., when the button 220 is received in the opening). The flange 275 may contact the rear surface 214 of the faceplate 210 when the faceplate is connected to the control module 240, e.g., to capture the button 220 between the faceplate and the control module. The diffuser portion 270 may conduct light emitted from light source(s) inside the control module 240 (e.g., light-emitting diodes 294 shown in FIG. 15) to illuminate the gap 238 around the respective button 220.

The elongated portion 280 of each button 220 may be received in respective openings 248 of the carrier 246 of the control module 240 (e.g., two of the plurality of openings 248 shown in FIG. 13). The elongated portion 280 may comprise a base 282 having ribs 284 that may be received in corresponding grooves 249 of the openings 248 of the carrier 246 (e.g., to prevent rotation of the buttons 220 when the elongated portions 280 are inserted in the openings 248). Each button 220 may have a return spring 285 surrounding the elongated portion 280. The return springs 285 may contact the carrier 246 and may bias each of the buttons 220 towards the faceplate 210, such that the flange 275 of the reflector portion 270 contacts the rear surface 214 of the faceplate.

The faceplate 210 may comprise posts 216 that extend from the rear surface 214 of the faceplate 210, and may be received in openings 252 in the front enclosure portion 242 of the control module 240. The faceplate 210 may be attached to the control module 240 via attachment screws 254 received through openings 256 in the rear enclosure portion 244 and openings 218 (e.g., threaded openings) in the posts 216 of the faceplate when the posts are located in the openings 252 of the front enclosure portion 242. When the faceplate 210 is attached to the control module 240, the buttons 220 may be captured between the faceplate and the control module.

Figure 15:
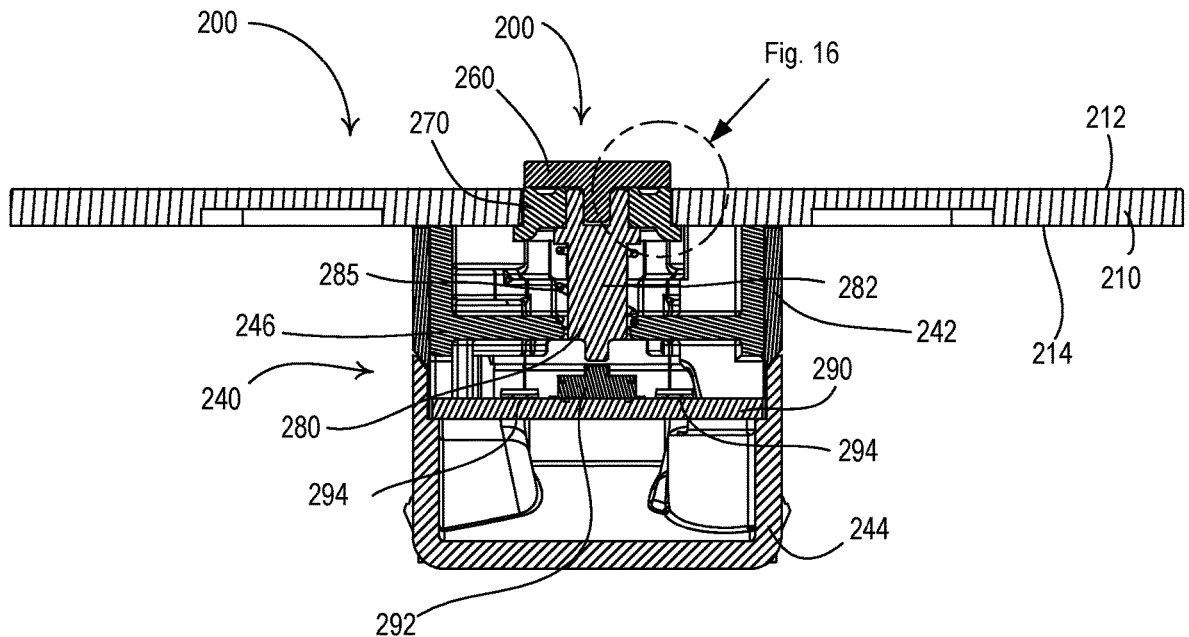
FIG. 15 is an example bottom cross-sectional view of the control device of FIG. 10 taken through the center of a button of the control device.

FIG. 15 is a bottom cross-sectional view of the keypad 200 taken through the center of one of the buttons 220, for example, the top button as shown in FIG. 11. The control module 240 may comprise a printed circuit board (PCB) 290 mounted between the front enclosure portion 242 and the rear enclosure portion 244. The elongated portion 280 of each button 220 may be configured to actuate a respective mechanical switch 292 (e.g., a mechanical tactile switch) mounted to the printed circuit board 290 inside of the control module 240. In response to an actuation of one of the buttons 220, the return springs 285 of the button may compress to allow the elongated portion 280 to travel through the respective opening 248 and actuate in the respective mechanical switch 292. The control module 240 may further comprise one or more light sources, such as light-emitting diodes (LEDs) 294, mounted to the printed circuit board 290 (e.g., two LEDs mounted behind each of the buttons 220 on both sides of each of the mechanical switch 292). The carrier 246 of the control module 240 may be made of a transparent or translucent material to allow light emitted by the LEDs 294 to be conducted through the carrier towards the faceplate 210. The diffuser portion 270 of each of the buttons 220 may operate to conduct the light emitted by the LEDs 294 to the gaps 238 surrounding each of the buttons 220.

Figure 16:
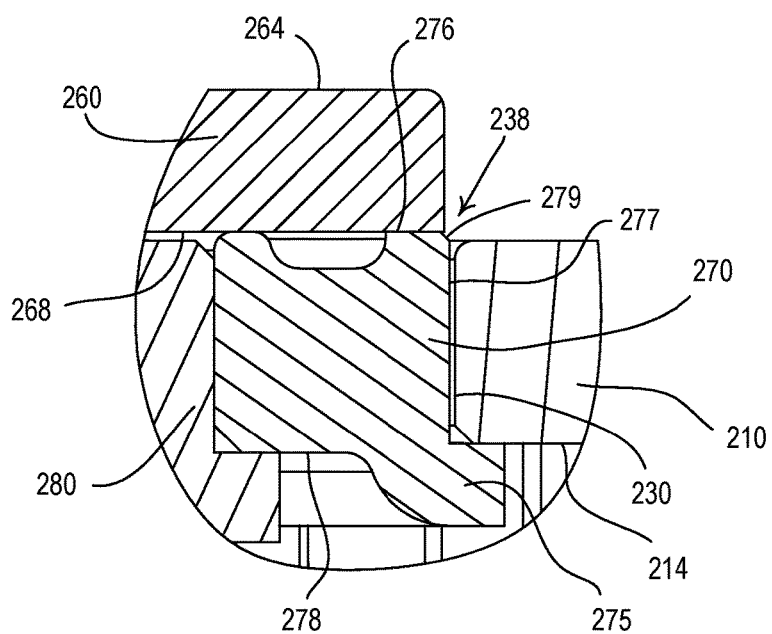
FIG. 16 is an example enlarged portion of the bottom cross-sectional view of FIG. 15.

FIG. 16 is an example enlarged portion of the bottom cross-sectional view of FIG. 15. As previously mentioned, the diffuser portion 270 may extend beyond a plane of a front surface of the faceplate 210 when each button 220 is received in the respective opening 230 of the faceplate 210, such that the diffuser portion can be seen from the sides of the keypad 200. The diffuser portion 270 may be positioned behind and overlap the gap 238 of the respective opening 230 when the cap portion 260 is received in the opening 230. A rear surface 268 of the cap portion 260 of each button 220 may contact a support surface 276 of the diffuser portion 270. The diffuser portion 270 may have a sidewall 277 and a rear surface 278 that may be opposite the support surface 276. The diffuser portion 270 may comprise a light-emitting surface 279 between the support surface 276 and the sidewall 277. The diffuser portion 270 may conduct light emitted by internal LEDs 294 and received by the rear surface 278 of the diffuser portion to the light-emitting surface 279. The light-emitting surface 279 may be configured to emit light through the gap 238 around the respective button 220. The light-emitting surface 279 may be oriented at an angle with respect to the support surface 276 and the sidewall 277.

Figure 17:
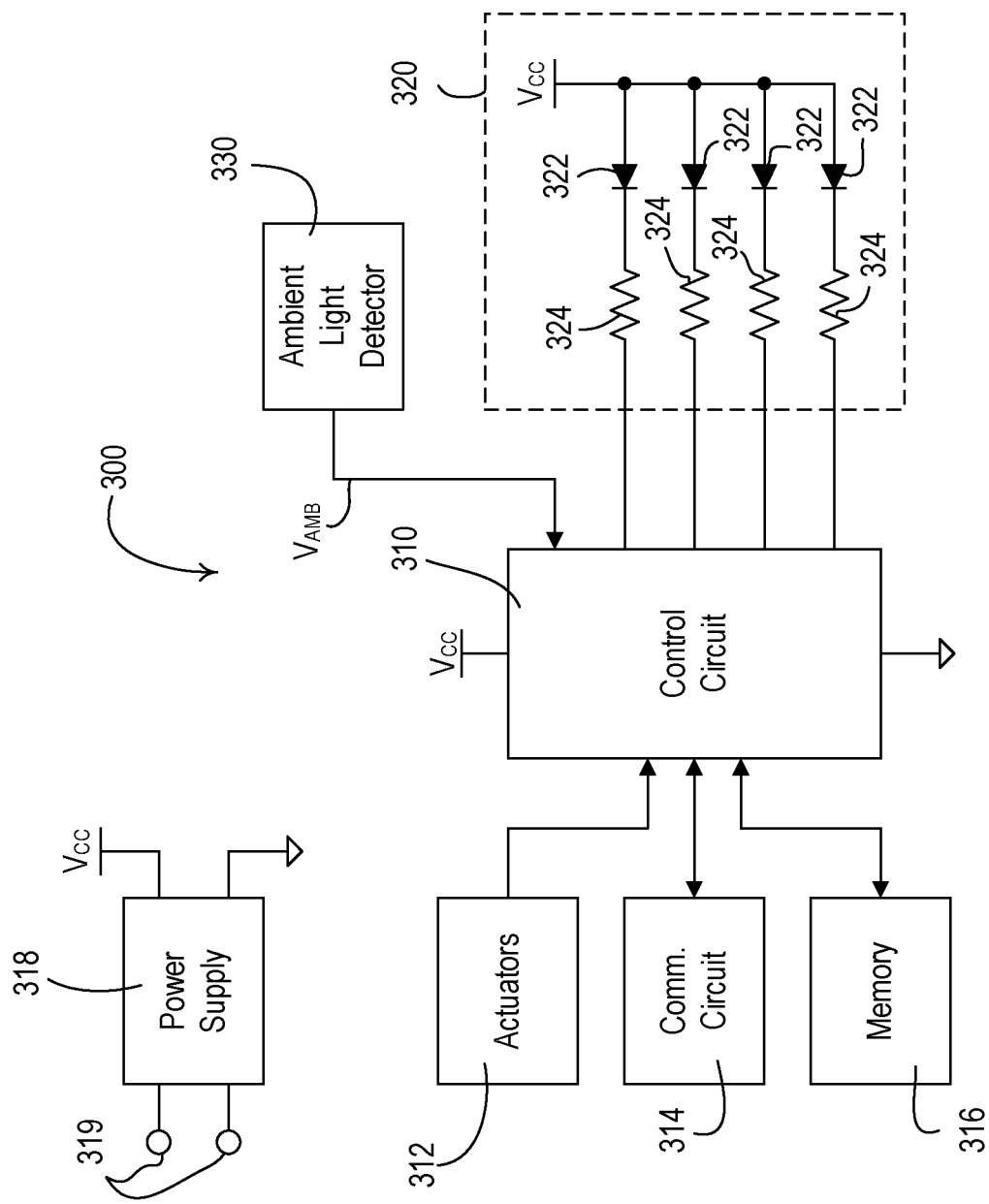
FIG. 17 is a simplified block diagram of an example control device.

FIG. 17 is a simplified block diagram of an example control device 300 that may be deployed as, for example, the keypad 100 shown in FIGS. 1-8, the keypad 100' shown in FIG. 9, or the keypad 200 shown in FIGS. 10-16. The control device 300 may comprise a control circuit 310, which may include one or more of a processor (e.g., a microprocessor), a microcontroller, a programmable logic device (PLD), a field programmable gate array (FPGA), an application specific integrated circuit (ASIC), or any suitable processing device. The control device 300 may comprise one or more actuators 312 (e.g., the mechanical switches of the keypad 100 and/or the mechanical switches 292 of the keypad 200), which may be actuated in response to actuations of one or more buttons (e.g., the buttons 120 of the keypad 100, the buttons 120' of the keypad 100', and/or the buttons 220 of the keypad 200). The control circuit 300 may be coupled to the actuators 312 for receiving user inputs.

The control device 300 may further comprise a communication circuit 314, such as, a wired communication circuit or a wireless communication circuit (e.g., an RF transmitter coupled to an antenna for transmitting RF signals). The control circuit 310 may be coupled to the communication circuit 314 for transmitting messages (e.g., digital messages) in response actuations of the actuators. For example, the control circuit may be configured to transmit a message for controlling the electrical load (e.g., including a command for controlling the electrical load) via the communication circuit 314 in response to an actuation of one of the buttons. Additionally or alternatively, the communication circuit 314 may include an RF receiver for receiving RF signals, an RF transceiver for transmitting and receiving RF signals, or an infrared (IR) transmitter for transmitter IR signals. In addition, the control circuit 310 may be configured to receive a digital message including, for example, a selected preset and/or the status of an electrical load controlled by an external load control device.

The control device 300 may also include a memory 316 communicatively coupled to the control circuit 310. The control circuit 310 may be configured to use the memory 316 for the storage and/or retrieval of, for example, commands and/or preset information to transmit in response to actuations of the buttons. The memory 316 may be implemented as an external integrated circuit (IC) or as an internal circuit of the control circuit 310.

The control device 300 may also comprise a power supply 318 for generating a direct-current (DC) supply voltage $V_{CC}$ for powering the control circuit 310, the communication circuit 314, the memory 316, and the other low-voltage circuitry of the control device. The power supply 318 may be coupled to an alternating-current (AC) power source or an external DC power source via electrical connections 319. Alternatively, the control device 300 may comprise an internal power source (e.g., one or more batteries) in place of, or for supplying power to, the power supply 318.

The control device 300 may further comprise an illumination circuit 320 for illuminating gaps around the buttons (e.g., the gaps 138 around the buttons 120 of the keypad 100). For example, the illumination circuit 320 may comprise one or more LEDs 322 (e.g., the LEDs 194, 294), such as four LEDs as shown in FIG. 17, which may be coupled to respective ports on the control circuit 310 via respective resistors 324. The control circuit 310 may be configured to individually turn each LED 322 on by pulling the respective port low towards circuit common, such that the LED is coupled between the supply voltage $V_{CC}$ and circuit common through the respective resistor 324. The control circuit 310 may be configured to dim the illumination of each LED 322, e.g., by pulse-width modulating an LED current conducted through each LED and adjusting a duty cycle of the respective pulse-width modulated LED current. While the control device 300 shown in FIG. 10 has one LED 322 for illuminating each of the buttons, each LED illustrated in FIG. 10 may comprise one or more LEDs coupled in series or parallel. For example, each LED 322 in FIG. 10 may comprise two LEDs coupled in series (e.g., the two LEDs 194, 294 shown in FIGS. 7 and 15).

The control circuit 310 may be configured to control the illumination circuit 320 to provide feedback to a user of the control device 300. The control circuit 310 may be configured to illuminate the gap around one of the buttons (e.g., by blinking and/or strobing the illumination) when that button is actuated (e.g., to indicate that the control circuit 310 has received the command and/or the communication circuit 314 is transmitting a message to external load control devices). The control circuit 310 may be configured to illuminate the gap around one of the buttons to indicate the status of one or more associated electrical loads (e.g., status information regarding whether the electrical loads are on or off). The control circuit 310 may be configured to illuminate the gap around one of the buttons to indicate the selection of a respective preset associated with the button. For example, the control circuit 310 may control the illumination circuit 320 to illuminate the gap around the button of the selected preset to a first intensity level and to illuminate the gaps around each of the other buttons to a second intensity level that may be less than the first intensity level. In addition, the control circuit 310 may be configured to control the illumination circuit 320 to illuminate the gaps around the buttons (e.g., to a dim level) to provide a nightlight feature.

The control device 300 may further comprise an ambient light detector 330 (e.g., an ambient light detection circuit) for measuring an ambient light level $L_{AMB}$ in the room in which the control device 300 is installed. The ambient light detector 330 may generate an ambient light detect signal $V_{AMB}$, which may indicate the ambient light level $L_{AMB}$ and may be received by the control circuit 310. The control circuit 310 may be configured to adjust duty cycles of the LED currents conducted through the LEDs 322 to adjust the intensities of LEDs in response to the measured ambient light level $L_{AMB}$ as determined from ambient light detect signal $V_{AMB}$. For example, the control circuit 310 may be configured to increase the intensities of the LEDs 322 when the ambient light level increases, and decrease the intensities of the LEDs 322 when the ambient light level decreases. Examples of keypads that control the intensities of LEDs in response to ambient light detectors are described in greater detail in commonly-assigned U.S. Pat. No. 9,763,302, issued Sep. 12, 2017, entitled CONTROL DEVICE HAVING BUTTONS WITH MULTIPLE-LEVEL BACKLIGHTING, and U.S. Pat. No. 9,860,952, issued Jan. 2, 2018, entitled CONTROL DEVICE HAVING BUTTONS WITH AUTOMATICALLY ADJUSTABLE BACKLIGHTING, the entire disclosures of which are hereby incorporated by reference.

The control device 300 may further comprise an internal load control circuit (not shown) that may be coupled between a power source (e.g., an alternating-current power source or a direct-current power source) and the electrical load for controlling the power delivered to the electrical load. The control circuit 310 may be configured to control the load control circuit to control the power delivered to the electrical load in response to the actuation of one or more of the buttons.

What is claimed is:

1. A control device, comprising:
   a faceplate defining an opening;
   a button configured to be received within the opening, the button including:
   a cap portion,
   a diffuser portion disposed adjacent to the cap portion, the diffuser portion including a flange that is configured to abut a rear surface of the faceplate, and
   an elongate portion extending from a rear surface of the diffuser portion;
   a spring surrounding a portion of the elongate portion of the button, the spring configured to bias the button toward the faceplate; and
   a light source configured to illuminate a gap between the button and the faceplate.

2. The control device of claim 1, further comprising a switch coupled to a circuit board, wherein an end of the elongate portion is configured to engage the switch.

3. The control device of claim 2, wherein the circuit board includes a control circuit configured to control the light source.

4. The control device of claim 3, wherein the control circuit is configured to control power delivered to an electrical load.

5. The control device of claim 2, wherein the light source includes at least one light emitting diode disposed on the circuit board adjacent to the switch.

6. The control device of claim 1, wherein the diffuser is configured to be at least partially received within the opening defined by the faceplate.

7. The control device of claim 1, further comprising a control module housing the light source and a circuit board, the control module including a carrier sized and configured to receive at least a portion of the elongate portion of the button.

8. A control device, comprising;
   a faceplate defining an opening;
   a button configured to be received within the opening defined by the faceplate, the button including:
   a cap portion,
   a diffuser portion disposed adjacent to the cap portion and including a flange that is configured to abut a rear surface of the faceplate, and
   an elongate portion extending from a rear surface of the diffuser portion;
   a control module configured to be coupled to the faceplate, the control module supporting a light source that is configured to illuminate a gap between the button and the faceplate; and
   a spring surrounding the elongate portion of the button and disposed between the control module and a surface of the button, the spring configured to bias the button toward the faceplate.

9. The control device of claim 8, wherein the control module supports a circuit board having a control circuit for controlling power delivered to an electrical load.

10. The control device of claim 9, wherein the control circuit is configured to control the light source in response to the button being pressed.

11. The control device of claim 10, wherein the control circuit is coupled to a switch disposed on the circuit board, the switch configured to be contacted by the elongate portion of the button when the button is pressed.

12. The control device of claim 11, wherein the light source includes at least one light emitting diode, the at least one light emitting diode disposed on the circuit board adjacent to the switch.

13. The control device of claim 12, wherein the elongate portion of the button is received within an opening defined by a carrier of the control module.

14. The control device of claim 13, wherein the spring is disposed between the carrier and the diffuser of the button.

15. The control device of claim 8, wherein a post extends from a rear surface of the faceplate, the post defining a threaded opening for receiving a threaded fastener for coupling the control module to the faceplate.

16. A control device, comprising:
   a faceplate defining an opening;
   a button configured to be received within the opening defined by the faceplate;
   a control module configured to be coupled to the faceplate, the control module including:
   a circuit board including a control circuit for controlling power delivered to an electrical load,
   a light source disposed on the circuit board and coupled to the control circuit, the light source configured to illuminate a gap between the button and the faceplate, and
   a switch coupled to the control circuit and configured to be contacted by an elongate portion of the button; and a spring disposed between a surface of the button and a surface of the control module, the spring configured to bias the button toward the faceplate.

17. The control device of claim 16, wherein the spring surrounds at least a portion of the elongate portion of the button.

18. The control device of claim 16, wherein the button includes a diffuser portion coupled to the elongate portion, the diffuser portion including a flange configured to abut a rear surface of the faceplate.

19. The control device of claim 16, wherein the control module includes a button support structure defining a second opening that is sized and configured to receive a portion of the elongate portion of the button therein.

20. The control device of claim 19, wherein the button support structure includes a groove in communication with the opening, the groove sized and configured to receive a rib that extends along the elongate portion of the button for preventing rotation of the button.

\* \* \* \* \*